Feb. 2, 1954  E. J. WILLIAMS  2,667,960
APPARATUS FOR SPACING ARTICLES ON CONVEYERS
Filed Dec. 17, 1951  4 Sheets-Sheet 1
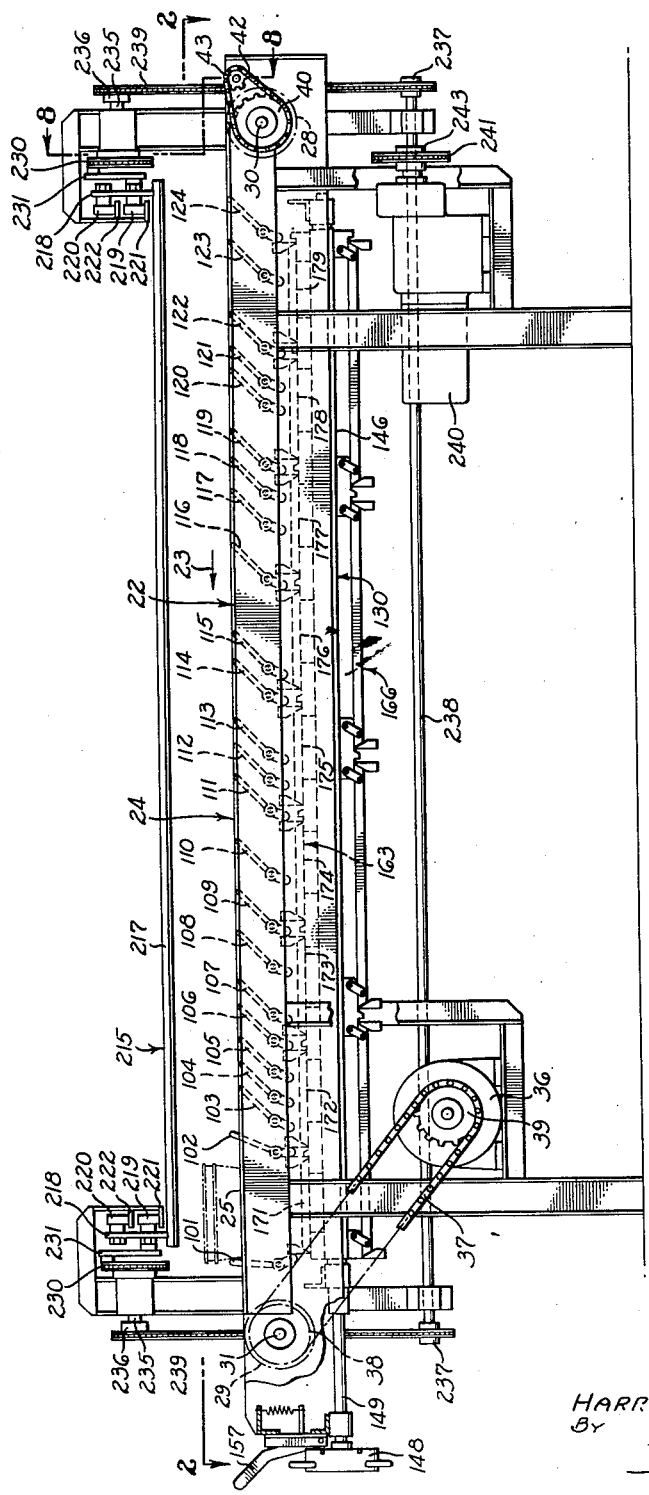
Fig.1.
INVENTOR.
EDWARD J. WILLIAMS
BY HIS ATTORNEYS.
HARRIS, KIECH, FOSTER & HARRIS
By

INVENTOR.
EDWARD J. WILLIAMS
BY HIS ATTORNEYS.
HARRIS, KIECH, FOSTER & HARRIS
BY

Feb. 2, 1954  E. J. WILLIAMS  2,667,960
APPARATUS FOR SPACING ARTICLES ON CONVEYERS
Filed Dec. 17, 1951  4 Sheets-Sheet 3
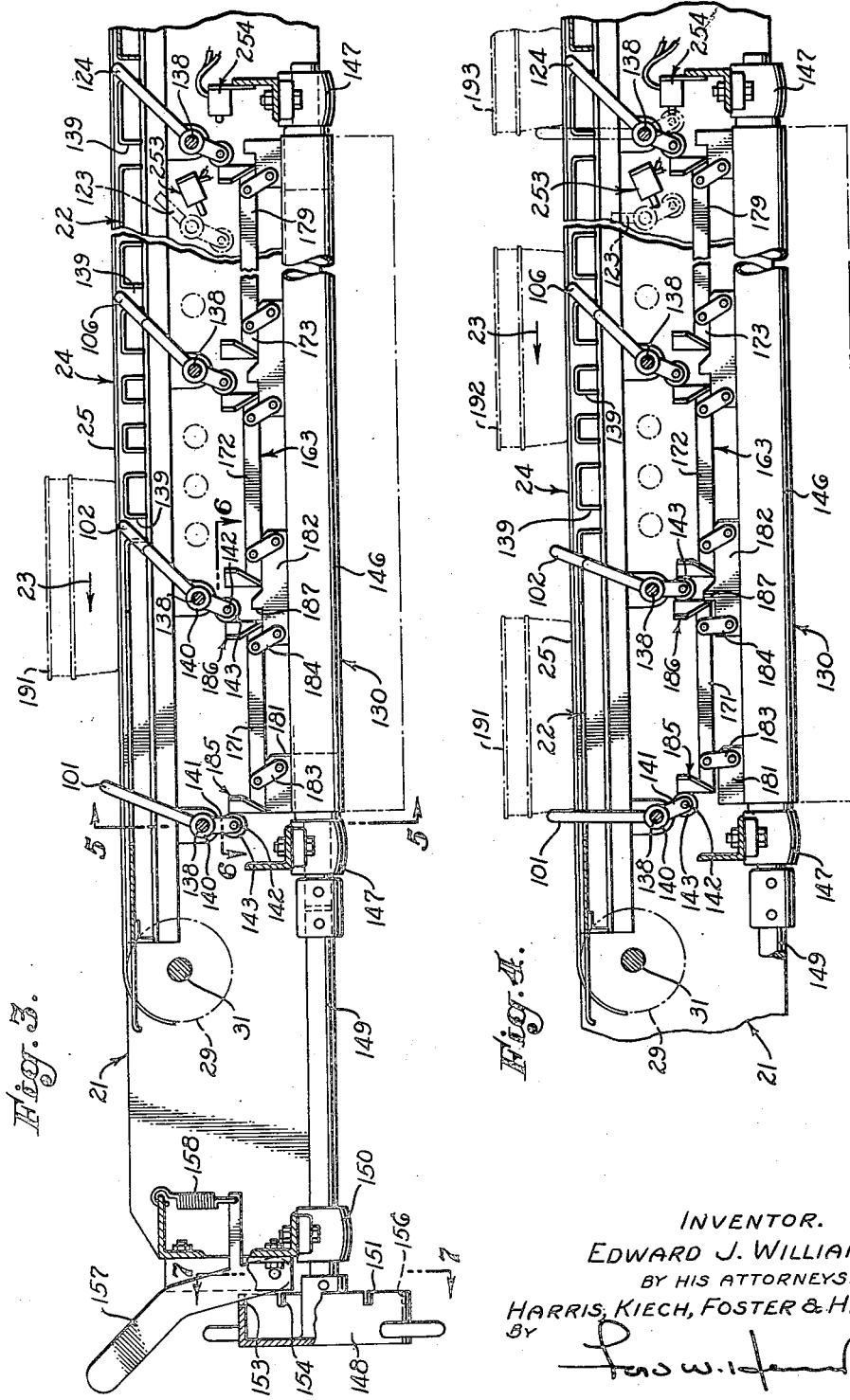
INVENTOR.
EDWARD J. WILLIAMS
BY HIS ATTORNEYS.
HARRIS, KIECH, FOSTER & HARRIS
BY

Feb. 2, 1954 — E. J. WILLIAMS — 2,667,960
APPARATUS FOR SPACING ARTICLES ON CONVEYERS
Filed Dec. 17, 1951 — 4 Sheets-Sheet 4
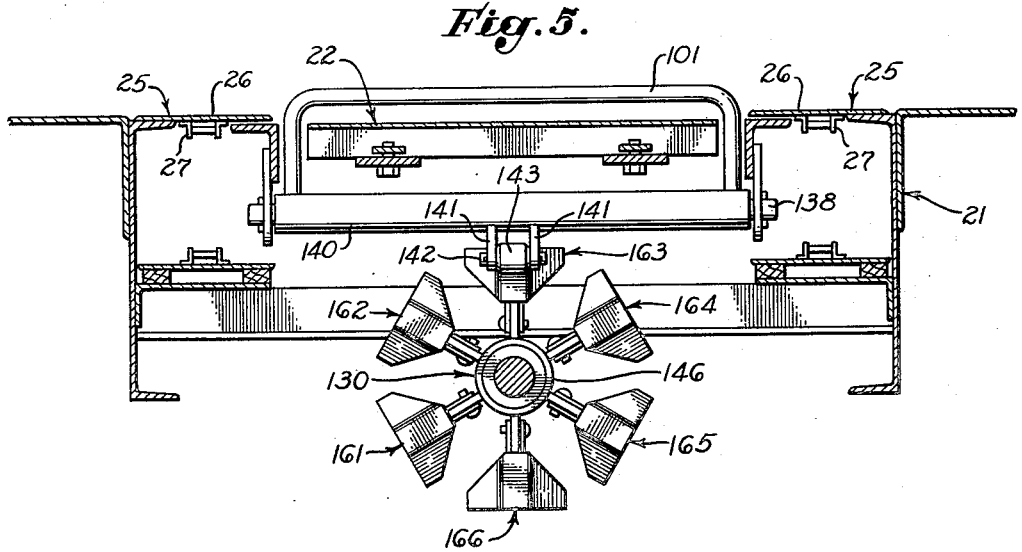
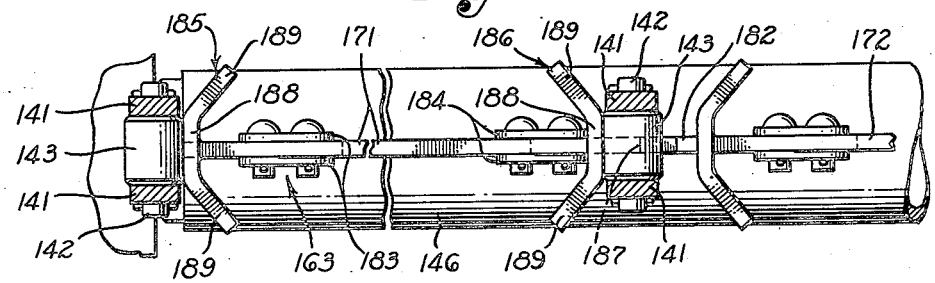
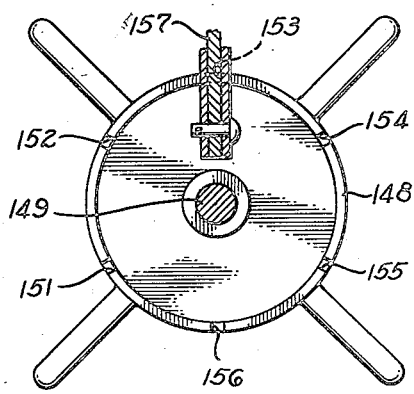
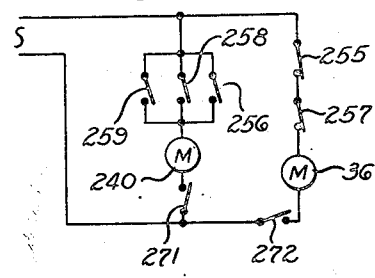
INVENTOR.
EDWARD J. WILLIAMS
BY HIS ATTORNEYS.
HARRIS, KIECH, FOSTER & HARRIS Patented Feb. 2, 1954

2,667,960

UNITED STATES PATENT OFFICE 2,667,960

APPARATUS FOR SPACING ARTICLES ON CONVEYERS

Edward J. Williams, Burbank, Calif., assignor to Read Standard Corporation, a corporation of Delaware Application December 17, 1951, Serial No. 262,075

9 Claims. (Cl. 198—34)

The present invention relates in general to an apparatus for spacing apart articles being transported in single file by a conveyor.

The invention is disclosed hereinafter in connection with an apparatus for periodically transferring articles being transported by a conveyor onto another conveyor operating transversely of the first so as to load the articles being transported by the first conveyor onto the second conveyor in the form of ranks extending transversely thereof, a primary object of the invention being to provide an improved apparatus for spacing articles apart predetermined distances in the direction of movement of the first conveyor so that the articles will be spaced apart transversely of the second conveyor when transferred thereonto.

The invention finds particular utility in the baking industry for spacing straps of pans containing bread or other goods to be baked in the direction of movement of a conveyor which delivers the pan straps to the inlet end of a traveling oven in single file and which operates at right angles to the traveling oven. The pan straps delivered to the inlet end of the oven in spaced relation in this manner are periodically loaded into the oven in the form of pan strap ranks extending transversely thereof. In such an application of the invention, the pan straps in each rank loaded into the traveling oven are spaced apart predetermined distances to prevent contact of the bakery goods in adjacent straps in the rank and to provide uniform circulation of heated air for all of the pan straps. While the invention may be employed for spacing pan straps particularly advantageously and will be considered in connection therewith hereinafter as a matter of convenience, it will be understood that the invention may be employed for spacing various other articles as well.

An important object of the invention is to provide an article spacing apparatus which is provided with means for spacing apart articles of various lengths, or of different numbers. More particularly, an object in this connection is to provide an article spacing apparatus having a plurality of spacing means each adapted to space apart articles of a particular length, or a particular number of articles, and having selector means for activating any one of the spacing means.

Thus, the present invention may be employed for spacing pan straps of different sizes and/or numbers, the size of a pan strap depending upon the dimensions of the individual pans incorporated therein, the spacing of the individual pans in the strap, the number of pans in the strap, and so forth. For example, a strap of bread pans includes a plurality of pans arranged side by side in spaced relation and secured together by an encircling strap, the dimension of the pan strap in the direction of the longitudinal axes of the individual pans depending upon the length of the pans, and the dimension of the pan strap crosswise of the individual pans depending upon the number of pans in the strap, the spacing of the pans, and so forth.

Considering the present invention more specifically, an important object thereof is to provide a conveyor for moving pan straps in single file along a predetermined path, a master stop positioned adjacent the downstream end of the path of the pan straps for intercepting the first pan strap in the file, and a sequence of slave stops spaced apart along the path of the pan straps upstream from the master stop for intercepting succeeding pan straps in the file.

More particularly, an important object of the invention is to provide such a spacing apparatus in which the first slave stop in the sequence is activated by the master stop upon interception of a pan strap by the master stop, the second slave stop in the sequence is activated by the first slave stop upon interception of a pan strap by the first slave stop, and so forth.

Another object is to provide such a spacing apparatus wherein the slave stops are normally disposed in inoperative, retracted positions and are movable into partially extended positions wherein they are operative to intercept pan straps upon interception of pan straps by the respective stops downstream therefrom, the respective slave stops being movable into their partially extended, operative positions in sequence as pan straps are intercepted by the adjacent stops downstream therefrom.

Another object is to provide a spacing apparatus wherein each slave stop is movable from its inoperative, retracted position to its operative, partially extended position in response to movement of the adjacent stop downstream therefrom from a partially extended, operative position to a fully extended position upon interception of a pan strap.

Thus, as the master stop intercepts a pan strap and is moved from its partially extended position to its fully extended position thereby, it moves the first slave stop in the sequence from its inoperative, retracted position to its partially extended position. As the first slave stop in the sequence is moved from its partially extended position to its fully extended position by a pan strap intercepted thereby it moves the second slave stop in the sequence from its inoperative, retracted position to its partially extended position, and so forth, which is an important feature of the invention.

Another important object of the invention is to provide such a spacing apparatus with a plurality of sequences of slave stops each of which is adapted to operate in conjunction with the master stop to space apart articles of a particular size, and to provide such a spacing apparatus with selector means for activating any one of the slave-stop sequences. A related object is to provide such a spacing apparatus wherein the spacing of each slave-stop sequence from the master stop and the spacing of the individual slave stops of such sequence differ from the corresponding spacings for the other slave-stop sequences so that each of the slave-stop sequences may be employed to space apart pan straps, or other articles, of a different length under the control of the aforementioned selector means.

Another important object of the invention is to provide a plurality of series of actuators for operating the sequences of slave stops, respectively, and to provide selector means for moving each series of actuators into engagement with the master stop and the corresponding sequence of slave stops.

Another object is to provide a selector means which includes a rotor carrying the series of actuators in circumferentially spaced relation, the rotor extending parallel to the path of the articles being transported by the conveyor and being rotatable to move each series of actuators into an operating station wherein it engages the master stop and the corresponding sequence of slave stops.

Another object is to provide an apparatus wherein each actuator is a push rod having ends adapted to engage two of the stops when it is in the operating station. More particularly, an object is to provide an apparatus wherein the first actuator in each series engages the master stop and the first slave stop of the corresponding sequence so as to move the first slave stop from its retracted position into its partially extended position in response to movement of the master stop from its partially extended position to its fully extended position upon interception of a pan strap thereby, wherein the second actuator in each series is adapted to engage the first and second slave stops of the corresponding sequence so as to move the second slave stop from its retracted position to its partially extended position in response to movement of the first slave stop from its partially extended position to its fully extended position by a pan strap intercepted thereby, and so forth.

Thus, the desired slave stop sequence may be activated merely by rotating the selector rotor into the desired position to bring the appropriate actuator series into engagement with the master stop and the corresponding slave-stop sequence, which is an important feature of the invention.

Another object is to provide an apparatus which includes transfer means for transporting the pan straps or other articles spaced apart by the spacing apparatus laterally into a traveling oven, for example.

Another object is to provide means for operating the spacing apparatus and the transfer means in timed relation, the transfer means being controlled by the last slave stop in the particular slave-stop sequence in operation so that the transfer means transports the spaced pan straps laterally only after the master stop and each of the slave stops in the slave-stop sequence in operation have intercepted the pan straps.

The foregoing objects of the present invention and the advantages suggested thereby, together with various other objects and advantages which will become apparent, may be attained with the exemplary embodiment of the invention which is illustrated in detail in the accompanying drawings and which is described hereinafter. Referring to the drawings:

Fig. 1 is a side elevation of a spacing apparatus of the invention;

Figs. 3 and 4 are enlarged, fragmentary elevational views illustrating the operation of the spacing apparatus;

Figure 8:
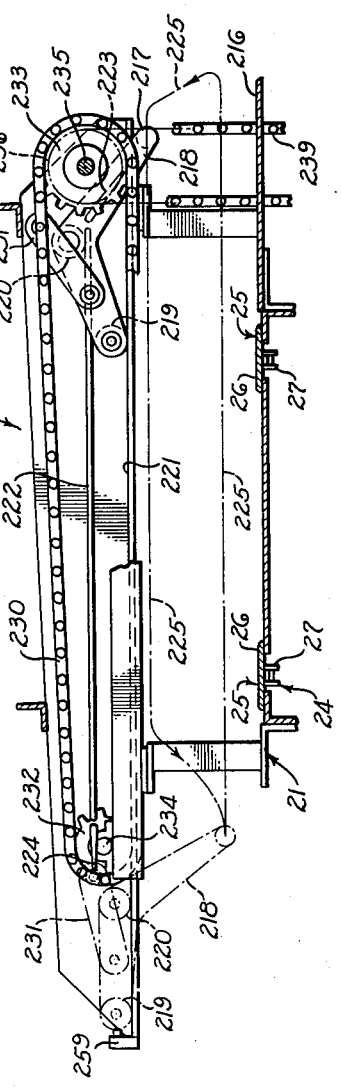

Figs. 5, 6 and 7 are further enlarged, fragmentary sectional views respectively taken along the arrowed lines 5—5, 6—6 and 7—7 of Fig. 3;

Fig. 8 is an enlarged, fragmentary sectional view taken along the arrowed line 8—8 of Fig. 1; and Fig. 9 is a schematic view of an electrical circuit of the spacing apparatus.

Figure 2:
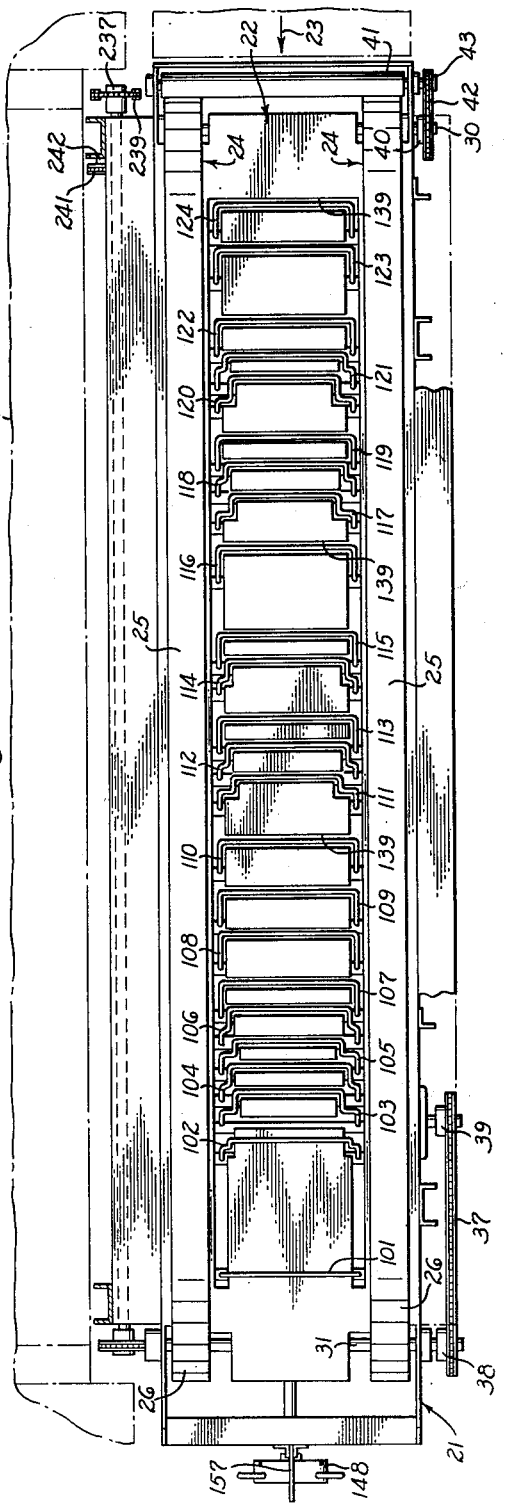
Fig. 2 is a sectional view of the spacing apparatus which is taken along the broken line 2—2 of Fig. 1.

Referring particularly to Figs. 1 and 2 of the drawings, the spacing apparatus of the invention illustrated therein includes a supporting structure or frame 21. Carried by the frame 21 is a generally horizontal platform 22 along which pan straps or other articles to be spaced apart are transported in the direction of the arrow 23 by a conveyor or conveyor means 24. As best shown in Figs. 2 and 5, the conveyor 24 includes two spaced, parallel, endless conveyor elements 25. In the particular construction illustrated, each conveyor element 25 comprises a plurality of plates 26 respectively connected to the links of a chain 27. The chains 27 are trained around sprockets 28 at the upstream end of the path of the pan straps along the platform 22, and are trained around sprockets 29 at the downstream end of such path. The sprockets 28 are mounted on a shaft 30 carried by suitable bearings on the frame 21, and the sprockets 29 are similarly mounted on a shaft 31 also carried by suitable bearings on the frame.

The conveyor 24 is driven by an electric motor 36 through a chain 37 trained around a sprocket 38 on the conveyor shaft 31 and a sprocket 39 on the motor shaft. The shaft 30 carries a sprocket 40 which drives a roller 41 at the upstream end of the pan strap through a chain 42 trained around the sprocket 40 and around a sprocket 43 connected to the roller 41. The purpose of the roller 41 is to bridge the gap between the conveyor 24 and another conveyor, not shown, which delivers pan straps to the conveyor 24.

Spaced apart along the path of the pan straps from the downstream end of such path toward the upstream end thereof are stops 101 to 124, inclusive, the stop 101 at the downstream end of the pan strap being a master stop and the remainder being slave stops. It will be understood that while 24 stops have been disclosed, this number may be increased or decreased as desired.

The stops 101 to 124 are arranged in six groups in the particular construction illustrated, the first group comprising the master stop 101 and the sequence of slave stops 107, 112, 117 and 123, the second group comprising the master stop 101 and the sequence of slave stops 105, 110, 115, 119 and 123, the third group comprising the master stop 101 and the sequence of slave stops 102, 106, 109, 111, 114, 116, 119, 122 and 124, the fourth group comprising the master stop 101 and the sequence of slave stops 103, 108, 111, 115, 117, 121 and 124, the fifth group comprising the master stop 101 and the sequence of slave stops 104, 109, 113, 116, 120 and 124, and the sixth group comprising the master stop 101 and the sequence of slave stops 107, 113, 118 and 124. The stops of each group are spaced apart along the pan strap paths substantially equal distances and are adapted to space pan straps of a predetermined length. Thus, the stops of the first group mentioned are adapted to space apart five pan straps, those of the second group are adapted to space apart six pan straps, those of the third are adapted to space apart ten straps, those of the fourth are adapted to space apart eight pan straps, those of the fifth are adapted to space apart seven pan straps, and those of the sixth are adapted to space apart five pan straps. It will be noted that while the stops of the first and sixth groups mentioned are adapted to space apart the same number of pan straps, different slave stops are involved in these two groups so that the two groups handle pan straps of two different lengths.

As will be discussed in more detail hereinafter, any one of the aforementioned slave-stop sequences of the six groups of stops may be activated, depending upon the length of the pan straps to be spaced apart. The spacing apparatus of the invention includes selector means 130 for activating any one of the slave-stop sequences in a manner to be described.

Considering the stops 101 to 124 in more detail with particular reference to Figs. 2 and 5, each of the stops is generally U-shaped and substantially spans the space between the conveyor elements 25. The arms of each U-shaped stop extend downwardly beneath the platform 22 and are rotatably mounted on a shaft 138 carried by the frame 21. The master stop 101 is rotatable about its shaft 138 from a first operative or partially extended position, which is shown in Fig. 3, to a second operative or fully extended position, which is shown in Fig. 4. Each of the slave stops 102 to 124 is rotatable about its shaft 138 from an inoperative, retracted position through a first operative, partially extended position to a second operative, fully extended position, each of the slave stops being retracted into a recess 139 in the platform 22 when in its inoperative position. For example, the inoperative positions of the slave stops 102, 106 and 124 are shown in Fig. 3, the partially extended position of the slave stop 102 being shown in Fig. 4. As will be apparent, when all of the slave stops 102 to 124 are in their retracted positions, they are inoperative to intercept pan straps being transported by the conveyor 24 so that the first pan strap in a file being transported by the conveyor is intercepted by the master stop 101, which is movable only between the partially and fully extended positions discussed above.

As best shown in Figs. 3, 4 and 5, each stop includes a sleeve 140 which receives the corresponding shaft 138 and to which the corresponding U-shaped portion is connected. Also connected to each sleeve 140 are two depending arms 141 between which extends a pin 142 carrying a roller 143, these rollers on the various stops being engageable by a system of actuators to be described hereinafter.

Referring to the master stop 101 in Fig. 4 of the drawings, it will be noted that it does not quite attain a vertical position so that it is returned to its partially extended position by gravity upon removal of a pan strap bearing thereagainst. The slave stops 102 to 124 are biased toward their retracted positions in the same manner. Thus, whenever pan straps bearing against the various stops are removed in a manner to be described, the various stops automatically return to their normal positions, the normal position of the master stop 101 being its partially extended position and the normal positions of the slave stops being their retracted positions.

The selector means 130 includes a selector rotor 146 substantially equal in length to the distance between the master stop 101 and the slave stop 124 and extending parallel to the path of pan straps being transported by the conveyor 24. The rotor 146 is located beneath the stops 101 to 124 and is rotatable in bearings 147 carried by the frame 21. The rotor 146 is connected to a selector actuator 148 by a shaft 149 mounted in a bearing 150. The selector actuator takes the form of a hand wheel in the particular construction illustrated and is provided with six notches 151, 152, 153, 154, 155 and 156, Figs. 3 and 7, therein respectively corresponding to the six groups of stops hereinbefore discussed. Insertable into any one of the notches 151 to 156 is a pivoted lever 157, this lever being biased toward the actuator 148 by a spring 158. As will be apparent, the actuator 148 may be released by moving the lever 157 to the right, as viewed in Fig. 3, whereupon the actuator may be rotated to bring another one of the notches 151 to 156 into alignment with this lever. Rotation of the actuator is, of course, communicated to the selector rotor 146 through the shaft 149.

In the particular construction illustrated, six actuating means 161, 162, 163, 164, 165 and 166 are carried by the selector rotor 146 and respectively correspond to the six groups of stops hereinbefore discussed in detail. All of the actuating means 161 to 166 appear in end elevation in Fig. 5 of the drawings and fragments of the actuating means 163 appear in side elevation in Figs. 3 and 4 and in plan in Fig. 6, the remaining actuating means being omitted from Figs. 3, 4 and 6 for the sake of clarity. Each of the actuating means 161 to 166 is rotatable into engagement with the group of stops corresponding thereto upon rotation of the selector rotor 146 by the selector actuator 148. The notches 151 to 156 respectively correspond to the actuating means 161 to 166 and, when a particular actuating means has been rotated into operative engagement with the group of stops corresponding thereto, the level 157 is inserted into the corresponding notch in the selector actuator 148 to retain the desired actuating means in operative engagement with the corresponding group of stops.

Each of the actuating means includes a number of actuators equal to the number of stops in the corresponding group minus one, the first actuator in each actuating means or series being adapted to engage the master stop 101 and the first slave stop in the corresponding slave stop sequence, the second actuator being adapted to engage the first and second slave stops in the corresponding slave stop sequence, the third actuator being adapted to engage the second and third slave stops in the corresponding sequence, and so forth. Except for the number of actuators therein and the lengths of such actuators, all of the actuating means 161 to 166 are alike so that only the actuating means 163 will be considered in detail.

Referring particularly to Fig. 1 of the drawings, since the group of stops corresponding to the actuating means 163 includes ten stops, viz., the master stop 101 and the sequence of slave stops 102, 106, 109, 111, 114, 116, 119, 122 and 124, this actuating means is, as indicated, above, provided with nine actuators 171 to 179 which are all aligned axially and which are movable axially of the selector rotor 146, i. e., which are movable along a line parallel to the axis of the rotor. As shown in Fig. 1 of the drawings, when the selector actuator 148 is rotated into a position such as to move the actuating means 163 into an operating station wherein the actuators 171 to 179 operatively engage the stops of the corresponding group, the first actuator 171 in this series is disposed between the rollers 143 of the master stop 101 and the first slave stop 102 in the corresponding sequence, the second actuator 172 is disposed between the rollers 143 of the first and second slave stops 102 and 106 of the corresponding sequence, the third actuator 173 is disposed between the rollers 143 of the second and third slave stops 106 and 109 of the corresponding sequence, and so forth. This relation is shown on a larger scale and in more detail in Figs. 3 and 4 wherein the master stop 101, the slave stops 102, 106 and 124, and the actuators 171, 172, 173 and 179 appear.

Referring particularly to Figs. 3 and 4, the actuator 171 of the actuating means 163 takes the form of a push rod which normally rests on two flanges 181 and 182 which are carried by and extend radially from the selector rotor 146, i. e., the actuator 171 rests on the flanges 181 and 182, as shown in Fig. 3, when no pan strap is intercepted by the master stop 101. The actuator 171 has pivotally connected thereto two links 183 and 184 which, in turn, are pivotally connected to the flanges 181 and 182, respectively. As will be apparent, this arrangement constitutes a three-bar linkage which permits movement of the actuator 171 longitudinally of the rotor 146 while maintaining the actuator parallel to the rotor. The actuator 171 is movable from the position shown in Fig. 3 to the position shown in Fig. 4 by the master stop 101 when the latter intercepts a pan strap being transported in the direction of the arrow 23 by the conveyor 24, the roller 143 being adapted to engage an end member 185 on the actuator 171 to communicate movement of the roller 143 of the master stop toward the right, as viewed in Figs. 3 and 4, into movement of the actuator in the same direction. Movement of the actuator 171 toward the right as viewed in Figs. 3 and 4 is limited by engagement of the end member 186 at the opposite end of the actuator with a stop 187 on the flange 182, the stop 187 being so positioned that the links 183 and 184 do not quite attain vertical orientations. Consequently, when a pan strap intercepted by the master stop 101 is disengaged therefrom in a manner to be described hereinafter, the action of gravity on the actuator 171 restores it to its normal position, i. e., the position shown in Fig. 3 of the drawings.

When the actuator 171 is moved from the position shown in Fig. 3 to that shown in Fig. 4 by the master stop 101, the end member 186 thereon engages the roller 143 of the first slave stop 102 in the corresponding slave-stop sequence and rotates this slave stop from its retracted position, shown in Fig. 3, to its partially extended position shown in Fig. 4.

The end members 185 and 186 of the actuator 171 are provided with central portions 188 which are substantially normal to the actuator 171 and are provided with wing portions 189 which make acute angles with the actuator 171 and which serve as cams for guiding the master stop 101 and the first slave stop 102 in the corresponding sequence into their proper positions relative to the actuator 171 when the selector rotor 146 is rotated to bring the corresponding actuating means 163 into the operating station. Thus, the wing portions 189 compensate for any minor misalignments of the actuator 171 and the stops 101 and 102 and thus avoid jamming of the mechanism.

The actuators 172 to 179 are duplicates of the actuator 171 and are mounted on the selector rotor 146 by means of pivoted links in the same way. Also, movement of the actuators 172 to 179 toward the right, as viewed in the drawings, is limited by stops in the same way. Consequently, the actuators 172 to 179 will not be described in detail.

Considering the operation of the actuating means 163, the numeral 191 in Figs. 3 and 4 of the drawings identifies a pan strap which is being moved in the direction of the arrow 23 by the conveyor 24. When this pan strap is intercepted by the master stop 101, Fig. 4, it rotates the master stop from its partially extended position to its fully extended position. When this occurs, the roller 143 of the master stop 101 acts on the end member 185 of the actuator 171 to move the actuator 171 from the position shown in Fig. 3 to that shown in Fig. 4, such movement of the actuator being limited by the stop 187 as previously discussed. At the same time, the end member 186 of the actuator 171 engages the roller 143 of the first slave stop 102 in the slave-stop sequence corresponding to the actuating means 163 and rotates this slave stop from its retracted position into its partially extended position, as shown in Fig. 4. Consequently, the first slave stop 102, which permitted passage of the pan strap 191 thereover when in its retracted position, is now in a position to intercept an oncoming pan strap 192, Fig. 4. When the pan strap 192 is intercepted by the first slave stop 102 in the sequence, this slave stop is moved from its partially extended position to its fully extended position, whereupon the roller 143 thereof moves the actuator 172 to the right, as viewed in Fig. 4. Such movement of the actuator 172 is communicated to the second slave stop 106 in sequence to move it from its retracted position to its partially extended position to enable this slave stop to intercept the next pan strap 193 in the file of pan straps being transported by the conveyor 24. This process is repeated until pan straps have been intercepted by the master stop 101 and all of the slave stops 102, 106, 109, 111, 114, 116, 119, 122 and 124 in this sequence. Thus, the master stop 101, on intercepting a pan strap, cocks the first slave stop 102 in the sequence under consideration, the slave stop 102 cocks the second slave stop 106 when the stop 102 intercepts a pan strap, the second slave stop 106 cocks the third slave stop 109 when the stop 106 intercepts a pan strap, and so forth. Subsequently, when the intercepted pan straps are removed from the conveyor 24 in a manner to be described hereinafter, the action of gravity restores the master stop 101 and the slave stops 102, 106, 109, 111, 114, 116, 119, 122 and 124 to their normal positions, shown in Fig. 3. Also the action of gravity restores the actuators 171 to 179 to their normal positions, shown in Fig. 3. Thus when the intercepted pan straps have been removed from the conveyor 24, the elements of the spacing apparatus automatically re-set themselves preparatory to spacing another file of pan straps.

If it is desired to space pan straps of a length other than that for which the slave stop sequence discussed in the preceding paragraphs is designed, it is merely necessary to rotate the selector rotor 146 into the position necessary to bring the desired one of the actuating means 161 to 166 into operative engagement with the corresponding group of stops. As previously indicated, the selector rotor 146 may be rotated to bring another actuator means into the operating station by releasing the lever 157 to permit rotation of the selector actuator 148, the lever 157 thereafter being inserted into the proper notch in the selector actuator to retain the desired actuating means in the operating station. Thus, any one of the six groups of stops heretofore discussed may be activated by bringing the proper one of the actuating means 161 to 166 into operative engagement therewith. As hereinbefore indicated, engagement and disengagement of the various actuating means and the various groups of stops are facilitated by the wing portions of the end members on the actuators, these wing portions serving to compensate for any minor misalignment of parts so that jamming of the mechanism is avoided.

Each of the other actuating means 161, 162, 164, 165 and 166 operates in the same manner as the actuating means 163. Also, each of the other groups of stops operates in the same manner as the group of stops comprising the master stop 101 and the slave-stop sequence 102, 106, 109, 111, 114, 116, 119, 122 and 124. Consequently, a detailed description of the operation thereof is unnecessary.

After the pan straps of a file being transported by the conveyor 24 have been spaced apart in the manner hereinbefore discussed, they may be transferred laterally into a traveling oven, not shown, operating at right angles to the conveyor 24, or onto any other conveyor, not shown, operating at right angles to the conveyor 24. Referring particularly to Figs. 1 and 8 of the drawings, illustrated therein is a transfer means 215 which may be employed to transfer the spaced pan straps laterally from the conveyor 24 along a lateral platform 216 leading to a traveling oven, or other apparatus. The transfer means 215 is illustrated as including a sweep bar 217 which is carried by arms 218 at its ends, each arm 218 being provided with rollers 219 and 220. Guides or tracks 221 and 222 are carried by the frame 21 at either end of the sweep bar 217, the roller 219 on each arm 218 being adapted to move back and forth along the corresponding track 221 and the roller 220 on each arm being adapted to move alternately on the corresponding track 221 and the corresponding track 222. Downwardly biased track switches 223 at one end of the tracks 222 serve to switch the rollers 220 onto the tracks 222 when they reach the corresponding end of the tracks 221. More particularly, assuming that the rollers 219 and 220 on the arms 218 are on the tracks 221, and that the arms are being moved toward the right, as viewed in Fig. 8 of the drawings, when the rollers 220 reach the right end of the tracks 221, they pass under the track switches 223, which then move downwardly so that, as the rollers 220 move toward the left, as viewed in Fig. 8, they move upwardly onto the upper tracks 222. When the rollers 220 reach the left end of the upper tracks 222, as viewed in Fig. 8, they drop down onto the lower tracks 221 again and then remain on the lower tracks during movement to the right, as viewed in Fig. 8, upwardly biased track switches 224 being provided to ease the rollers 220 downwardly onto the lower tracks.

Thus, as will be apparent, with the pattern of movement described above, the sweep bar 217 follows the path designated by the arrowed broken line 225, the sweep bar acting to transfer spaced pan straps laterally from the conveyor 24 during movement thereof along the lower leg of the path, and returning above any pan straps on the conveyor 24 during its return movement along the upper leg of its path.

The sweep bar 217 is driven by chains 230 respectively disposed at the ends thereof and respectively connected to the arms 218 supporting the sweep bar by links 231, the links being pivotally connected to the arms 218 and to the chains 230 so that the rollers 219 and 220 carried by each arm may follow the pattern of movement discussed above. Each of the chains 230 is trained around sprockets 232 and 233 respectively mounted on shafts 234 and 235 carried by suitable bearings on the frame 21. As best shown in Fig. 1, the shafts 235 carry additional sprockets 236 which are driven from sprockets 237 on a countershaft 238 through chains 239. The countershaft 238 is driven by an electric transfer drive motor 240 through a chain 241 trained around a sprocket 242 (Fig. 2) on the countershaft and a sprocket 243 on the motor shaft.

It will be recalled that in some of the slave-stop sequences discussed previously, the last slave stop is 123, while in others, the last slave stop is 124. The invention provides means responsive to the interception of a pan strap by the last slave stop in the sequence in operation, i. e., either the slave stop 123 or the slave stop 124, for de-energizing the conveyor motor 36 and for energizing the transfer motor 240 so that the transfer means 215 is activated to sweep the spaced pan straps off the conveyor 24. For this purpose, the slave stops 123 and 124, when rotated into their fully extended positions by intercepted pan straps, are adapted to actuate switch means 253 and 254 respectively. As best shown in Fig. 4 of the drawings, the switch means 253 is engageable with the roller-supporting arms 141 of the slave stop 123 when this slave stop has been rotated into its fully extended position by an intercepted pan strap, and the switch means 254 is engageable by the roller 143 of the slave stop 124 when this slave stop has been rotated into its fully extended position by an intercepted pan strap. It will be understood that the switch means 253 and 254 are not actuated simultaneously, but are actuated one at a time, the switch means 253 being actuated only when the slave stop 123 is the last slave stop in the sequence, and the switch means 254 being actuated only when the slave stop 124 is the last slave stop in the sequence. The switch means 253 includes two switches 255 and 256 and the switch means 254 includes two switches 257 and 258, all of which are illustrated in diagrammatic form in Fig. 9 of the drawings. The switches 255 and 257 are connected in series with each other and with the conveyor motor 36 and are normally closed, i. e., are closed as long as the respective slave stops 123 and 124 are not in their fully extended positions. However, the switch 255 is opened when the slave stop 123 is moved into its fully extended position by an intercepted pan strap and, similarly, the switch 257 is opened when the slave stop 124 is moved into its fully extended position by an intercepted pan strap. Thus, full extension of either of the slave stops 123 and 124 opens the circuit to the conveyor motor 36 to stop the conveyor 24. The switches 256 and 258 are connected in parallel with respect to each other and are connected in series with the transfer motor 240, these switches being normally open, i. e., being open as long as the respective slave stops 123 and 124 are not in their fully extended positions. However, full extension of either of the slave stops 123 and 124 closes the corresponding switch 256 or 258 to energize the transfer motor 240. Also connected in parallel with the switches 256 and 258 and in series with the transfer motor 240 is a switch 259 which, as shown in Fig. 8, is engageable by one of the arms 218 carrying the sweep bar 217 when the sweep bar reaches a rest position, shown in phantom in Fig. 8. The switch 259 is a limit switch which is self closing, but which is adapted to be held open by one of the arms 218 when the sweep bar is in its rest position.

Considering the over-all operation of the invention, it will be assumed that the sweep bar 217 is in its rest position so that the switch 259 is open, and that no pan straps are intercepted by any of the stops 101 to 124, which means that the slave stops 123 and 124 are in their retracted positions so that the switches 255 and 257 are closed and the switches 256 and 258 are open. Under such conditions, the conveyor drive motor 36 is energized to drive the conveyor 24, but the transfer drive motor 240 is de-energized.

Now assume that a file of pan straps is delivered to the inlet end of the conveyor 24 in any suitable manner, as by another conveyor, not shown. Also assume that the selector actuator 148 has been set in the position required to activate the sequence of slave stops corresponding to the pan strap length being handled and/or the number of straps desired.

As hereinbefore discussed in more detail, the first pan strap in a file transported by the conveyor 24 passes over all of the slave stops and is intercepted by the master stop 101. Under the conditions outlined above, the master stop, in being moved from its partially extended position to its fully extended position by the pan strap intercepted thereby, moves the first slave stop of the activated slave-stop sequence into its partially extended position to intercept the second pan strap, this process being repeated until all of the slave stops in the sequence in operation have intercepted pan straps. When the last slave stop in the sequence in operation, either the slave stop 123 or the slave stop 124, intercepts a pan strap, it is rotated to its fully extended position, and, as this occurs, it actuates the corresponding switch means 253 or 254, thereby opening one of the switches 255 and 257 and closing one of the switches 256 and 258. Consequently, the conveyor motor 36 is de-energized and the transfer motor 240 is energized. De-energizing the conveyor motor 36 interrupts delivery of pan straps to the spacing apparatus, while energization of the transfer motor 240 causes the sweep bar 217 to transfer the spaced pan straps laterally from the conveyor 24. As soon as the sweep bar 217 has transferred the spaced pan straps from the conveyor 24, the slave stops of the sequence in operation fall back into their retracted positions under the influence of gravity, and the master stop 101 falls into its partially extended position under the action of gravity. When the slave stop in the activated sequence falls back into its retracted position, the corresponding one of the switches 255 and 257 is closed to re-energize the conveyor motor 36 and, at the same time, the corresponding one of the switches 256 and 258 is reopened so that the transfer motor is energized only through the switch 259 at this point. The re-energization of the conveyor motor 36 causes the conveyor 24 to deliver additional pan straps to the article spacing apparatus, whereupon the foregoing sequence of events is repeated. Because of the presence of the switch 259 in the circuit of the transfer motor 240, the transfer motor continues to operate until it has returned the sweep bar 217 to its rest position, whereupon the limit switch 259 is opened to de-energize the transfer drive motor. The transfer drive motor remains de-energized until such time as pan straps have been intercepted by the master stop 101 and by all of the slave stops in the sequence in operation, whereupon the foregoing cycle of events is repeated in its entirety.

Preferably, a switch 271, actuable by the apparatus, such as an oven, to which the pan straps are delivered, is connected in series with the transfer motor 240 so that this motor cannot be energized by one of the switches 256, 258, or 259 until such apparatus is ready to receive the pan straps. A similar electrical interlock may be provided between the conveyor motor 36 and the sweep bar 217 by providing a switch 272 in series with the conveyor motor 36 and actuable by the sweep bar 217 after it has cleared the conveyor 24. Thus, the conveyor 24 cannot start until all of the pan straps being transferred by the sweep bar 217 have completely cleared it.

Thus, the present invention provides an apparatus for automatically and accurately spacing apart articles being transported by a conveyor so that the spaced articles may be transferred laterally from the path of the conveyor in spaced relation, or may be otherwise handled. Also, the present invention provides an apparatus for spacing apart articles of different lengths under the control of a selector means for selecting the article stops to be activated. It will be understood that although a spacing apparatus having six slave-stop sequences has been disclosed, the number of such sequences may be increased or decreased as desired, depending upon the number of article sizes to be handled. Also, the number of slave stops in each sequence may be increased or decreased as desired.

Although an exemplary embodiment of the invention has been illustrated herein, it will be understood that various changes, modifications and substitutions may be incorporated in such embodiment without departing from the spirit of the invention.

I claim as my invention:

1. In an apparatus for spacing articles, the combination of: a supporting structure providing a path having upstream and downstream ends; conveyor means carried by and movable relative to said supporting structure for moving articles in succession along said path toward said downstream end thereof; a plurality of spacing means carried by said supporting structure for spacing articles apart along said path; a plurality of actuating means for actuating said spacing means, respectively, said actuating means being movable into engagement with said spacing means, respectively; and rotatable selector means carried by said supporting structure and carrying said actuating means for moving said actuating means into engagement with said spacing means, respectively, successively.

2. In an apparatus for spacing articles, the combination of: a supporting structure providing a path having upstream and downstream ends; conveyor means carried by and movable relative to said supporting structure for moving articles in succession along said path toward said downstream end thereof; a movable master stop carried by said supporting structure adjacent said downstream end of said path and disposed in said path for intercepting an article being transported by said conveyor means, said master stop being movable from a first operative position to a second operative position by an article intercepted thereby; a plurality of sequences of movable slave stops carried by said supporting structure, said slave stops of each of said sequences being spaced apart along said path upstream from said master stop, each of said slave stops being movable from an inoperative position through a first operative position to a second operative position, said slave stops being inoperative to intercept articles being transported by said conveyor means when in their inoperative positions, but being disposed in said path when in their first operative positions so as to intercept articles being transported by said conveyor means, and said slave stops being movable from their first operative positions to their second operative positions by articles intercepted thereby; a plurality of series of actuators respectively corresponding to said sequences of slave stops, said actuators of each of said series respectively being engageable with said slave stops of the corresponding one of said sequences to move said slave stops of said corresponding sequence from their inoperative positions to their first operative positions to intercept articles being transported by said conveyor means, the first actuator in each of said series also being engageable with said master stop and being operable by said master stop upon interception thereby of an article being transported by said conveyor means to move the first slave stop in the corresponding one of said sequences from its inoperative position to its first operative position, and the second and subsequent actuators in each of said series also being engageable with the first and subsequent slave stops in the corresponding one of said sequences, respectively, and being operable by the first and subsequent slave stops in the corresponding one of said sequences, respectively, upon interception thereby of articles being transported by said conveyor means so as to respectively move the second and subsequent slave stops in the corresponding one of said sequences from their inoperative positions to their first operative positions; and selector means for moving said series of actuators into engagement with said master stop and said sequences of slave stops, respectively, successively, said selector means comprising a rotor carried by and rotatable relative to said supporting structure adjacent said master stop and said sequences of slave stops and carrying said series of actuators, said series of actuators being circumferentially spaced around said rotor so that rotation of said rotor moves said series of actuators into engagement with said master stop and said sequences of slave stops, respectively, successively.

3. An apparatus as defined in claim 2 wherein said actuators are movably mounted on said rotor for movement axially thereof, the actuators of each of said series being axially aligned.

4. In an apparatus for spacing articles, the combination of: a supporting structure providing a path having upstream and downstream ends; conveyor means carried by and movable relative to said supporting structure for moving articles in succession along said path toward said downstream end thereof; a pivoted master stop carried by said supporting structure adjacent said downstream end of said path and disposed in said path for intercepting an aricle being transported by said conveyor means, said master stop being pivotable from a first operative position to a second operative position by an article intercepted thereby; a plurality of pivoted slave stops carried by said supporting structure and spaced apart along said path upstream from said master stop, each of said slave stops being pivotably from an inoperative position through a first operative position to a second operative position, said slave stops being inoperative to intercept articles being transported by said conveyor means when in their inoperative positions, but being disposed in said path when in their first operative positions so as to intercept articles being transported by said conveyor means, and said slave stops being movable from their first operative positions to their second operative positions by articles intercepted thereby; a rotor carried by said supporting structure with its axis parallel to said path; and a plurality of series of actuators for said slave stops carried by said rotor, said series being spaced apart circumferentially of said rotor and being engageable with selected ones of said stops when rotated into an operating station adjacent said stops in response to rotation of said rotor, each of said actuators being engageable with two of said stops when its series is in said operating station and being movable axially of said rotor so as to move one of the stops which it engages from its inoperative position to its first operative position in response to movement of the other stop which it engages from its first operative position to its second operative position by an intercepted article on said conveyor means, one of the actuators in each of said series being engageable with said master stop and one of said slave stops when its series is in said operating station and each of the other actuators in each series being engageable with two slave stops when its series is in said operating station, each of said series having a different number of said actuators therein.

5. An apparatus according to claim 4 wherein each of said actuators is a push rod having ends respectively engageable with two of said stops.

6. In an apparatus for spacing articles, the combination of: a supporting structure providing a path having upstream and downstream ends; conveyor means carried by and movable relative to said supporting structure for moving articles in succession along said path toward said downstream end thereof; a movable master stop carried by said supporting structure adjacent said downstream end of said path and disposed in said path for intercepting an article being transported by said conveyor means, said master stop being movable from a first operative position to a second operative position by an article intercepted thereby; a sequence of movable slave stops carried by said supporting structure and spaced apart along said path upstream from said master stop, each of said slave stops being movable from an inoperative position through a first operative position to a second operative position, said slave stops being inoperative to intercept articles being transported by said conveyor means when in their inoperative positions, but being disposed in said path when in their first operative positions so as to intercept articles being transported by said conveyor means, and said slave stops being movable from their first operative positions to their second operative positions by articles intercepted thereby; a rotor carried by said supporting structure adjacent said stops and substantially parallel to said path; and a series of actuators carried by said rotor, said actuators being axially aligned and being movable axially of said rotor and being rotatable into and out of an operating station upon rotation of said rotor, the first actuator in said series being engageable with said master stop and the first slave stop in said sequence to move said first slave stop from its inoperative position to its first operative position in response to movement of said master stop from its first operative position to its second operative position by an intercepted article when said actuators are in said operating station, the second actuator in said series being engageable with the first and second slave stops in said sequence so as to move said second slave stop from its inoperative position to its first operative position in response to movement of said first slave stop from its first operative position to its second operative position by an intercepted article when said actuators are in said operating station, the third actuator in said series being engageable with the second and third slave stops in said sequence so as to move said third slave stop from its inoperative position to its first operative position in response to movement of said second slave stop from its first operative position to its second operative position by an intercepted article when said actuators are in said operating station, and so forth, the last actuator in said series being engageable with the last and the next-to-the-last slave stops in said sequence so as to move said last slave stop from its inoperative position to its first operative position in response to movement of said next-to-the-last slave stop from its first operative position to its second operative position by an intercepted article when said actuators are in said operating station.

7. An apparatus according to claim 6 wherein each of said actuators is a push rod having ends respectively engageable with two of said stops when said actuators are in said operating station.

8. An apparatus according to claim 6 wherein each of said actuators is a push rod having ends respectively engageable with two of said stops, each of said actuators being connected to said rotor by two pivoted links providing for axial movement thereof relative to said rotor.

9. An apparatus according to claim 6 wherein said stops are pivotally connected to said supporting structure and are provided with depending arms engageable with said actuators.

EDWARD J. WILLIAMS.

References Cited in the file of this patent

UNITED STATES PATENTS

| Number | Name | Date |
|---|---|---|
| 2,549,341 | Sperling | Apr. 17, 1951 |
| 2,595,022 | Temple | Apr. 29, 1952 |